(12) United States Patent
Leis et al.

(10) Patent No.: US 12,173,983 B2
(45) Date of Patent: Dec. 24, 2024

(54) ARCHERY BOW STAND

(71) Applicant: MCP IP, LLC, Sparta, WI (US)

(72) Inventors: Amos M. Leis, Sparta, WI (US); John R. Scovil, Onalaska, WI (US); Mark J. Hayes, Onalaska, WI (US)

(73) Assignee: MCP IP, LLC, Sparta, WI (US)

( * ) Notice: Subject to any disclaimer, the term of this patent is extended or adjusted under 35 U.S.C. 154(b) by 0 days.

(21) Appl. No.: 17/525,676

(22) Filed: Nov. 12, 2021

(65) Prior Publication Data

US 2022/0155038 A1 May 19, 2022

Related U.S. Application Data

(60) Provisional application No. 63/113,750, filed on Nov. 13, 2020.

(51) Int. Cl.
*F41B 5/14* (2006.01)
*F16M 11/16* (2006.01)

(52) U.S. Cl.
CPC ........... *F41B 5/1453* (2013.01); *F16M 11/16* (2013.01)

(58) Field of Classification Search
CPC ..... F16B 5/1453; F16M 11/16; F16M 11/242; F16M 11/245; F16M 11/247; F16M 11/38
See application file for complete search history.

(56) References Cited

U.S. PATENT DOCUMENTS

| | | | |
|---|---|---|---|
| 1,128,248 A | 2/1915 | Hetzel | |
| 2,188,237 A | * 1/1940 | Weaver | F16M 13/00 |
| | | | 248/168 |
| 2,268,070 A | * 12/1941 | Geisler | F16M 11/242 |
| | | | 248/523 |
| 3,235,997 A | 2/1966 | Stoner | |
| 3,235,998 A | 2/1966 | Hadley | |
| 3,256,872 A | 6/1966 | Koser | |
| 3,441,241 A | * 4/1969 | Brooks | F41B 5/14 |
| | | | 248/156 |
| D260,674 S | 9/1981 | Simmons | |
| 4,351,224 A | 9/1982 | Curtis | |
| 4,360,179 A | * 11/1982 | Roberts | F41B 5/14 |
| | | | 248/126 |
| 4,397,112 A | 8/1983 | York | |
| 4,542,875 A | * 9/1985 | DeBaun | A47G 1/1646 |
| | | | 248/491 |
| D314,303 S | 2/1991 | Glaspie | |
| 5,106,044 A | 4/1992 | Regard, III | |
| 5,205,272 A | 4/1993 | Boyer | |
| D346,636 S | 5/1994 | Bechtel | |
| 5,775,658 A | 7/1998 | Englehardt | |
| D406,302 S | 3/1999 | Simpson et al. | |
| 5,913,668 A | 6/1999 | Messer | |
| 6,131,556 A | 10/2000 | Villarreal | |

(Continued)

*Primary Examiner* — Christopher Garft
(74) *Attorney, Agent, or Firm* — Laabs Intellectual Property

(57) ABSTRACT

In some embodiments, a bow stand comprises a first body portion comprising a first cavity. A second body portion is moveable with respect to the first body portion. The second body portion comprises a second cavity. A third body portion is moveable with respect to the first body portion and comprises a third cavity. The first cavity, the second cavity and the third cavity form an engagement cavity arranged to engage a frame of an archery bow.

18 Claims, 7 Drawing Sheets

(56) References Cited

U.S. PATENT DOCUMENTS

| | | | |
|---|---|---|---|
| 6,205,992 B1 | 3/2001 | Meeks et al. | |
| 6,283,875 B1 | 9/2001 | Jones | |
| 6,749,170 B1 | 6/2004 | Rhoads | |
| 6,763,627 B1 | 7/2004 | Kaempe | |
| 6,957,648 B1 | 10/2005 | Adcock | |
| D513,055 S | 12/2005 | Lahti | |
| 7,036,497 B2 | 5/2006 | Horn | |
| 7,156,086 B1 | 1/2007 | Wells | |
| D540,904 S | 4/2007 | Werner | |
| 7,197,844 B2 | 4/2007 | Benson | |
| D553,219 S | 10/2007 | Potterfield | |
| 7,314,199 B1 | 1/2008 | Ward | |
| 7,380,486 B1 | 6/2008 | Bean | |
| 8,596,597 B1 | 12/2013 | Spicer | |
| 8,882,070 B2 * | 11/2014 | Bean | F41B 5/1453 248/220.21 |
| D773,581 S | 12/2016 | Brooks | |
| 9,568,270 B1 | 2/2017 | LoRocco et al. | |
| 9,803,950 B1 | 10/2017 | Khoshnood et al. | |
| D819,159 S | 5/2018 | Leis et al. | |
| 10,208,889 B2 * | 2/2019 | Jaggard | F16M 11/242 |
| D952,092 S | 5/2022 | Saunders | |
| 11,385,015 B2 | 7/2022 | Coalson et al. | |
| 2003/0042388 A1 | 3/2003 | Peterson | |
| 2005/0188596 A1 | 9/2005 | Wygant | |
| 2008/0169389 A1 * | 7/2008 | Hill | F16M 11/22 248/166 |
| 2009/0090830 A1 * | 4/2009 | Bean | F41B 5/14 248/276.1 |
| 2017/0248385 A1 | 8/2017 | Yehle et al. | |
| 2018/0340647 A1 * | 11/2018 | Jaggard | F24C 3/027 |
| 2022/0155038 A1 | 5/2022 | Leis et al. | |

* cited by examiner

ARCHERY BOW STAND

CROSS-REFERENCE TO RELATED APPLICATIONS

This application claims the benefit of U.S. Patent Application No. 63/113,750, filed Nov. 13, 2020, the entire content of which is hereby incorporated herein by reference.

BACKGROUND OF THE INVENTION

This invention relates generally to archery and more particularly to a stand capable of supporting an archery bow.

Archery bows are generally known in the art. A bow is often arranged in a vertical orientation during use but is unable to support itself in such an orientation. Thus, bows are often placed on the ground in a horizontal orientation when not in use, which is not desirable.

In the past, certain devices have been attached to bows to assist a bow in maintaining a vertical orientation while being supported by the ground. Such devices often provide one or two contact surfaces with the ground and rely upon the bow itself or another attached accessory, such as a stabilizer, to provide a third contact surface.

Archery bows often have limb members that flex as the bow is drawn and fired. Prior bow stands often engage a limb and will therefore impact performance of the bow. Limb-attached bow stands in general must be detached from the bow when the bow is in use.

There remains a need for novel archery bow stand designs that provide benefits over prior designs.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a bow stand comprises a first body portion comprising a first cavity. A second body portion is moveable with respect to the first body portion. The second body portion comprises a second cavity. A third body portion is moveable with respect to the first body portion. The third body portion comprises a third cavity. The he first cavity, the second cavity and the third cavity form an engagement cavity arranged to engage a frame of an archery bow.

In some embodiments, a bow stand comprises a first body portion comprising a first cavity. A second body portion is moveable with respect to the first body portion. The second body portion comprises a second cavity. A third body portion is moveable with respect to the first body portion and comprises a third cavity. The first cavity, the second cavity and the third cavity form an engagement cavity arranged to engage a frame of an archery bow.

In some embodiments, the first body portion extends nonparallel to the second body portion.

In some embodiments, a stop is arranged to limit movement of the second body portion with respect to the first body portion.

In some embodiments, the first body portion comprises a first cavity, the second body portion comprises a second cavity and the engagement cavity comprises the first cavity and the second cavity.

In some embodiments, the first body portion comprises the first contact surface and the second body portion comprises the second contact surface.

In some embodiments, the bow stand comprises a third body portion moveable with respect to the first body portion.

In some embodiments, the third body portion comprises the third contact surface.

In some embodiments, the third body portion comprises a third cavity and the engagement cavity comprises the third cavity.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
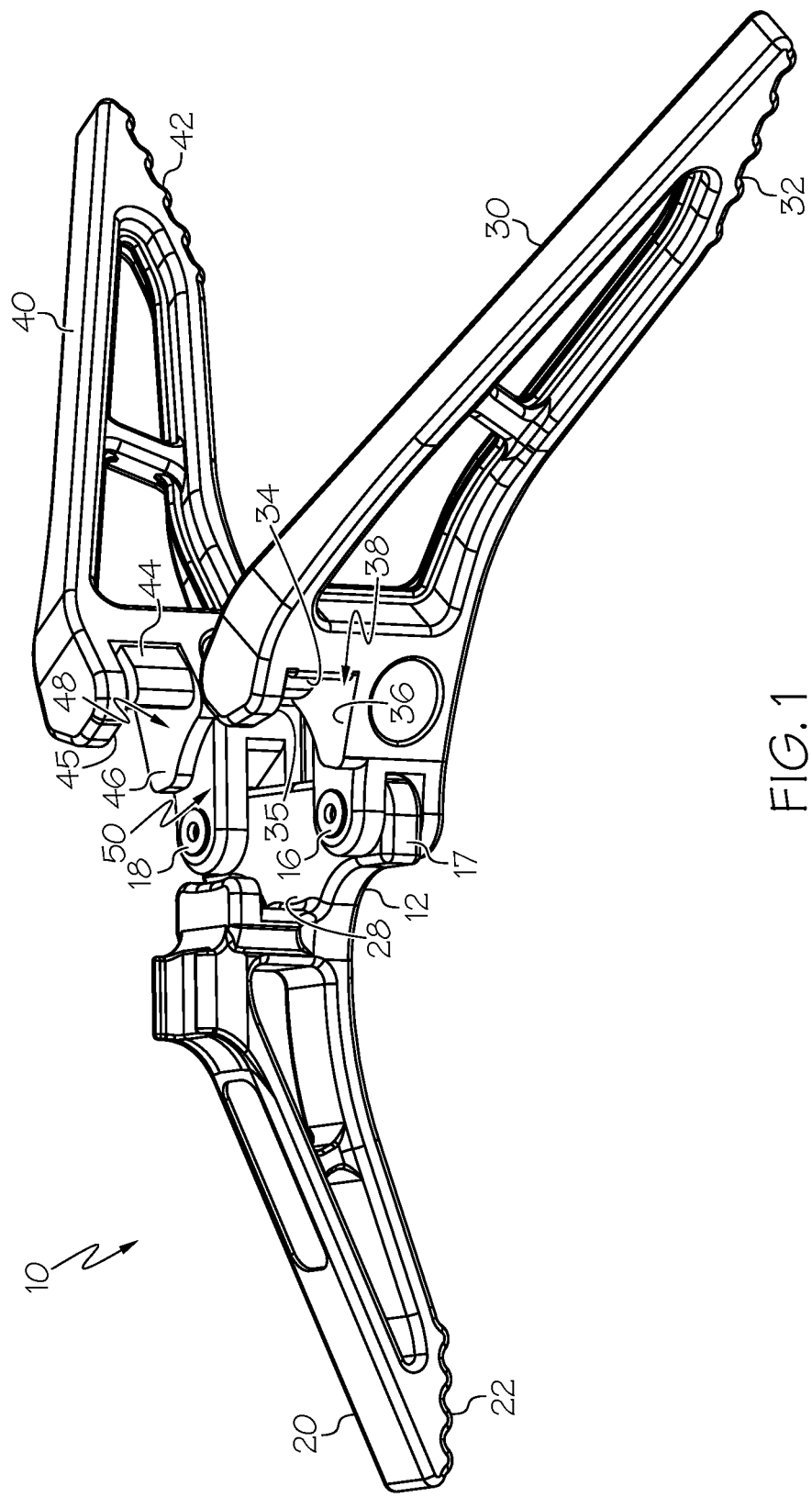
FIGS. 1-3 show views of an embodiment of an archery bow stand.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
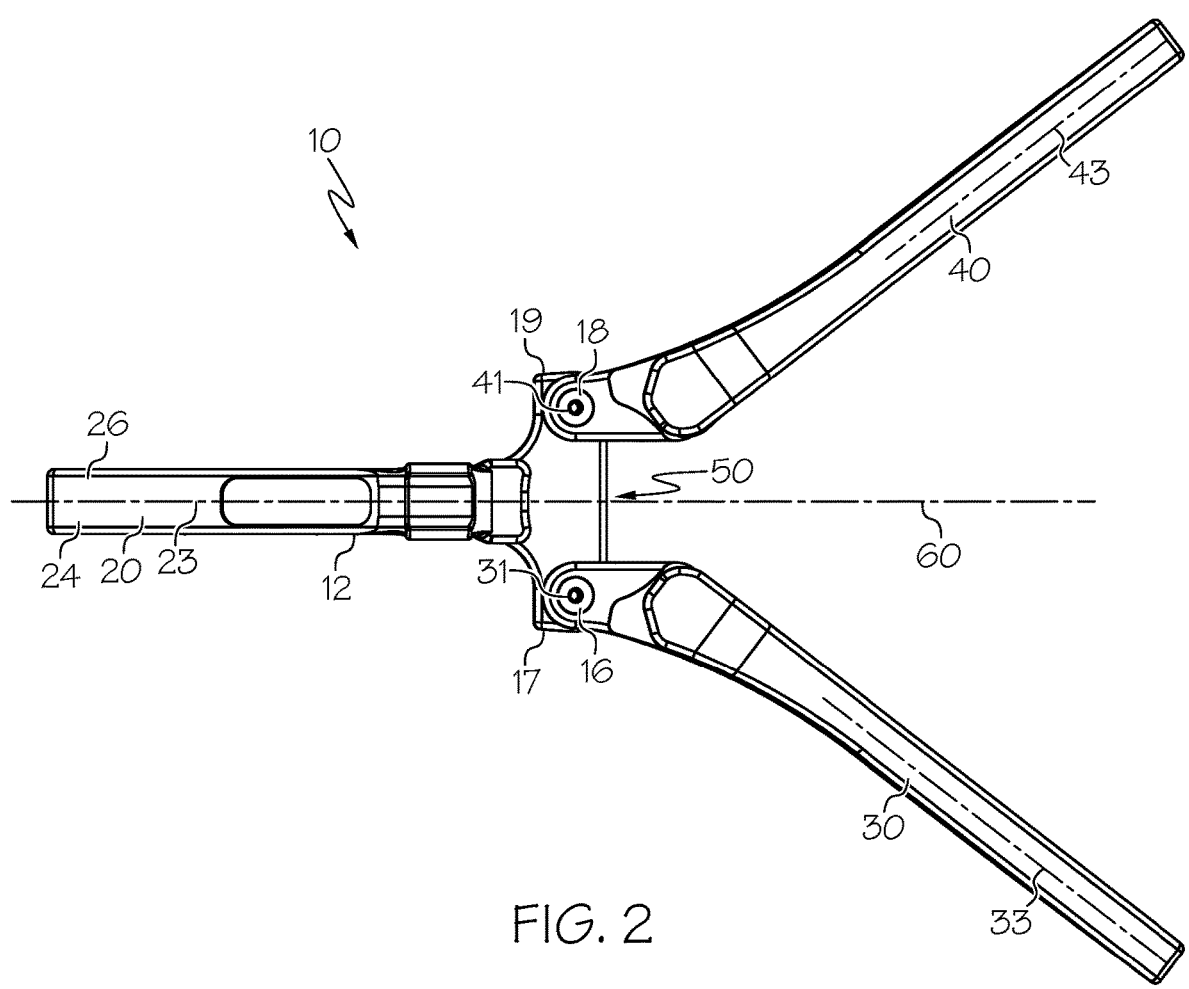
Figure 3:
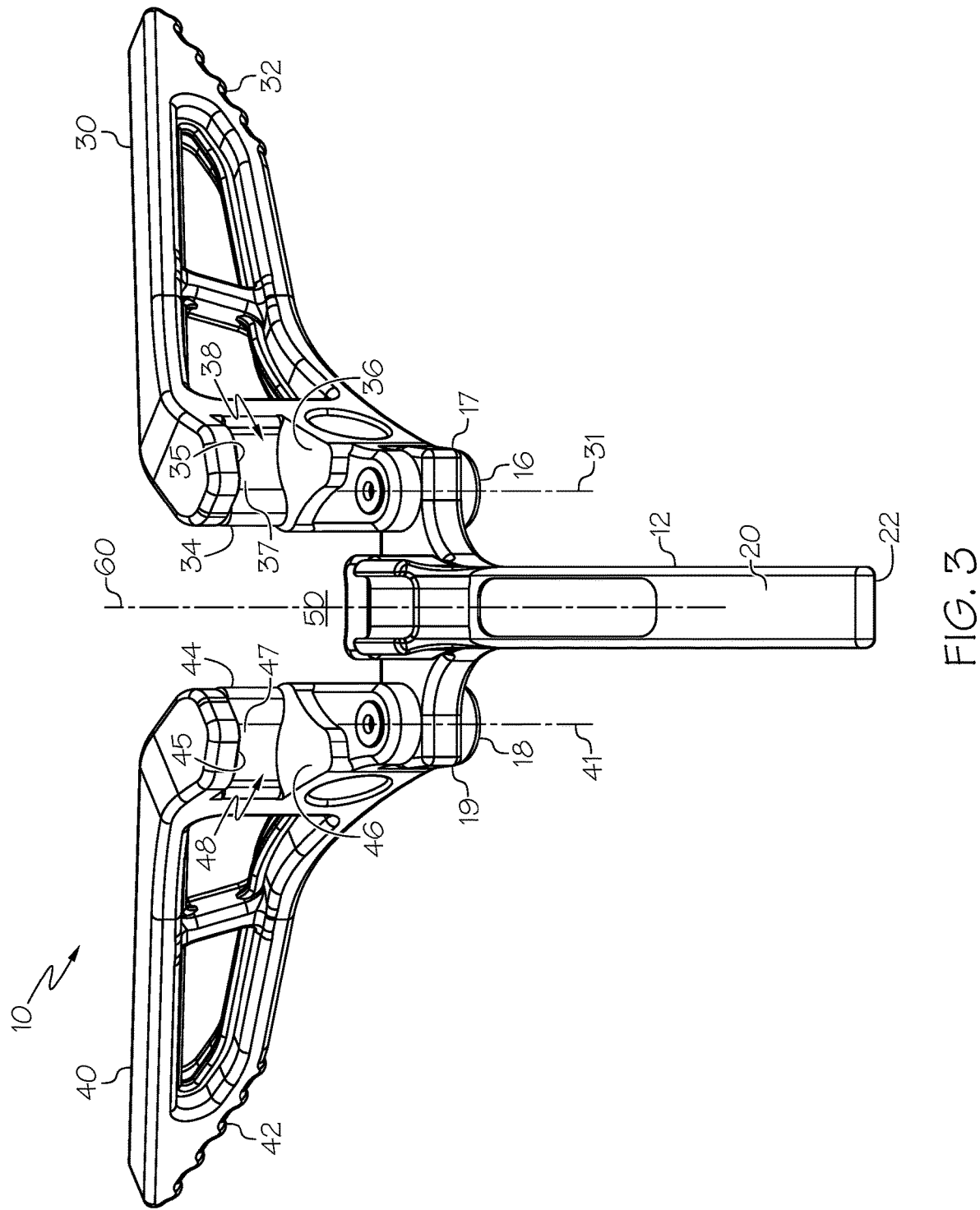

FIGS. 1-3 show an embodiment of an archery bow stand 10. In some embodiments, a bow stand 10 comprises a body 12 that is arranged to support an archery bow.

In some embodiments, the body 12 comprises a first body portion 20 and a second body portion 30 moveable with respect to the first body portion 20. In some embodiments, the second body portion 30 is rotatable about a first axis 31. In some embodiments, the body 12 comprises a hinge 16 between the first body portion 20 and the second body portion 30. In some embodiments, the body 12 comprises a stop 17 arranged to limit movement of the second portion 30 with respect to the first portion 20. In some embodiments, first body portion 20 comprises the stop 17. In some embodiments, the stop 17 comprises an interfering surface arranged to contact the second body portion 30.

In some embodiments, the body 12 comprises a third body portion 40 moveable with respect to the first body portion 20. In some embodiments, the third body portion 40 is rotatable about a second axis 41. In some embodiments, the body 12 comprises a second hinge 18 between the first body portion 20 and the third body portion 40. In some embodiments, the body 12 comprises a second stop 19 arranged to limit movement of the third portion 40 with respect to the first portion 20. In some embodiments, first body portion 20 comprises the second stop 19. In some embodiments, the second stop 19 comprises an interfering surface arranged to contact the third body portion 40.

In some embodiments, the first axis 31 is oriented parallel to the second axis 41.

In some embodiments, the second body portion 30 and the third body portion 40 are shaped symmetrically. In some embodiments, the second body portion 30 comprises a mirror image of the third body portion 40, for example taken across a longitudinal reference midline or a longitudinal reference plane 60. In some embodiments, a longitudinal reference plane 60 bisects the first body portion 20. In some embodiments, a first half 24 of the first body portion 20 is symmetrical with a second half 26 of the first body portion 20 across the reference plane 60.

Desirably, the body 12 defines an engagement cavity 50 suitable for receiving an archery bow. In some embodiments, a shape of the engagement cavity 50 changes at the body portions 20, 30, 40 are moved with respect to one another.

In some embodiments, the first body portion 20 comprises a first cavity 28. In some embodiments, the second body portion 30 comprises a second cavity 38. In some embodiments, the first cavity 28 and the second cavity 38 define the engagement cavity 50. In some embodiments, the third body portion 40 comprises a third cavity 48. In some embodiments, the first cavity 28, second cavity 38 and third cavity 48 define the engagement cavity 50.

In some embodiments, the first cavity 28 is defined by opposed surfaces that are arranged to engage a frame of an archery bow.

In some embodiments, the second cavity 38 is defined by a first surface 35 and a second surface 36. In some embodiments, the first surface 35 is opposed to the second surface 36. In some embodiments, the second cavity 38 is further defined by a third surface 37. In some embodiments, at least a portion of the third surface 37 is orthogonal to the first surface 35. In some embodiments, at least a portion of the third surface 37 is orthogonal to the second surface 36.

In some embodiments, the third cavity 48 is defined by a first surface 45 and a second surface 46. In some embodiments, the first surface 45 is opposed to the second surface 46. In some embodiments, the third cavity 48 is further defined by a third surface 47. In some embodiments, at least a portion of the third surface 47 is orthogonal to the first surface 45. In some embodiments, at least a portion of the third surface 47 is orthogonal to the second surface 46.

In some embodiments, the second body portion 30 comprises a bumper 34. In some embodiments, the bumper 34 comprises the third surface 37. In some embodiments, the bumper 34 is moveable with respect to the second body portion 30. In some embodiments, the bumper 34 is integral with the second body portion 30 and moves via elastic deformation. In some embodiments, the third body portion 40 comprises a second bumper 44. In some embodiments, the second bumper 44 comprises the third surface 47. In some embodiments, the bumpers 34, 44 are arranged to contact an archery bow.

In some embodiments, the bow stand 10 comprises three contact points arranged to contact a supporting surface. In some embodiments, the bow stand 10 is capable of supporting an archery bow with no part of the archery bow contacting the ground. In some embodiments, the bow stand 10 comprises a first contact location 22, a second contact location 32 and a third contact location 42. In some embodiments, the contact locations are aligned on a common plane. In some embodiments, the first body portion 20 comprises the first contact location 22. In some embodiments, the second body portion 30 comprises the second contact location 32. In some embodiments, the third body portion 40 comprises the third contact location 42.

In some embodiments, each contact location 22, 32, 42 comprises a plurality of peaks and valleys.

In some embodiments, the body 12 comprises an orientation wherein a longitudinal axis 23 of the first body portion 20 extends nonparallel to a longitudinal axis 33 of the second body portion 30. In some embodiments, a longitudinal axis 43 of the third body portion 40 extends nonparallel to a longitudinal axis 23 of the first body portion 20 and nonparallel to a longitudinal axis 33 of the second body portion 30.

Figure 4:
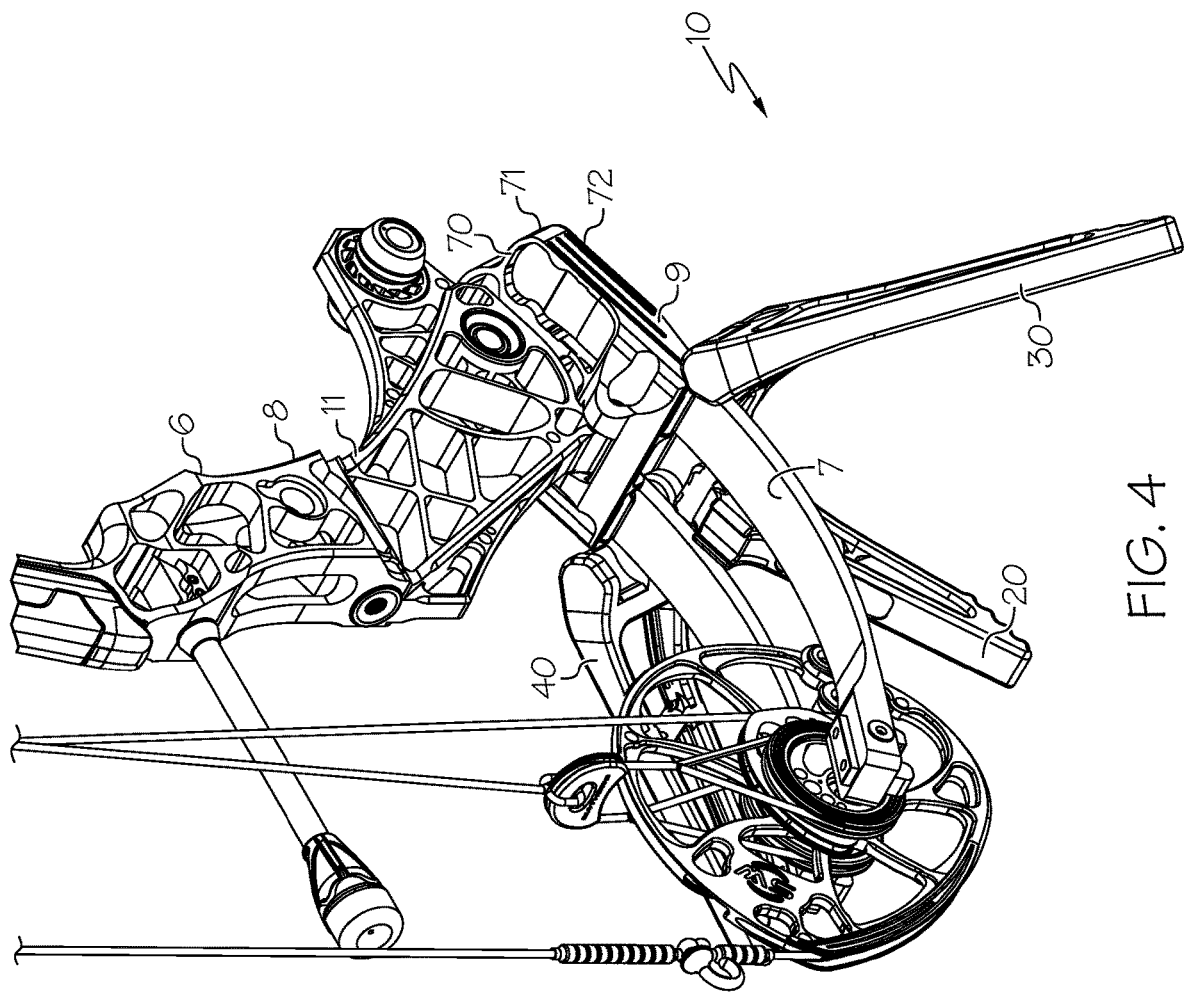
FIGS. 4 and 5 show an embodiment of an archery bow stand being engaged with an archery bow.

FIG. 4 shows an embodiment of a bow stand 10 and an embodiment of an archery bow 6. In some embodiments, the archery bow 6 comprises a frame 8, and in some embodiments, the frame 8 comprises a riser 11 and a limb cup 9 attached to the riser 11. In some embodiments, the bow stand 10 is arranged to engage the frame 8. In some embodiments, the bow stand 10 is arranged to engage the limb cup 9.

In some embodiments, a limb cup 9 comprises a first surface 70 and a second surface 72. In some embodiments, the first surface 70 is opposed to the second surface 72. In some embodiments, the first surface 70 comprises a top surface and the second surface 72 comprises a bottom surface. In some embodiments, a limb cup 9 comprises a third surface 71. In some embodiments, the third surface 71 comprises a sidewall and extends between the first surface 70 and the second surface 72. In some embodiments, a limb cup 9 comprises features as disclosed in U.S. Pat. No. 8,453,635, the entire content of which is hereby incorporated herein by reference.

In some embodiments, the body 12 can be arranged in a first orientation, such as an installation orientation. In some embodiments, the body portions 30, 40 contact the stops 17, 19 in the first orientation. In some embodiments, a distance across the engagement cavity 50 is at a maximum in the first orientation. In some embodiments, a portion of an archery bow 6 can be positioned in the engagement cavity 50 when the bow stand 10 is in the first orientation.

Figure 5:
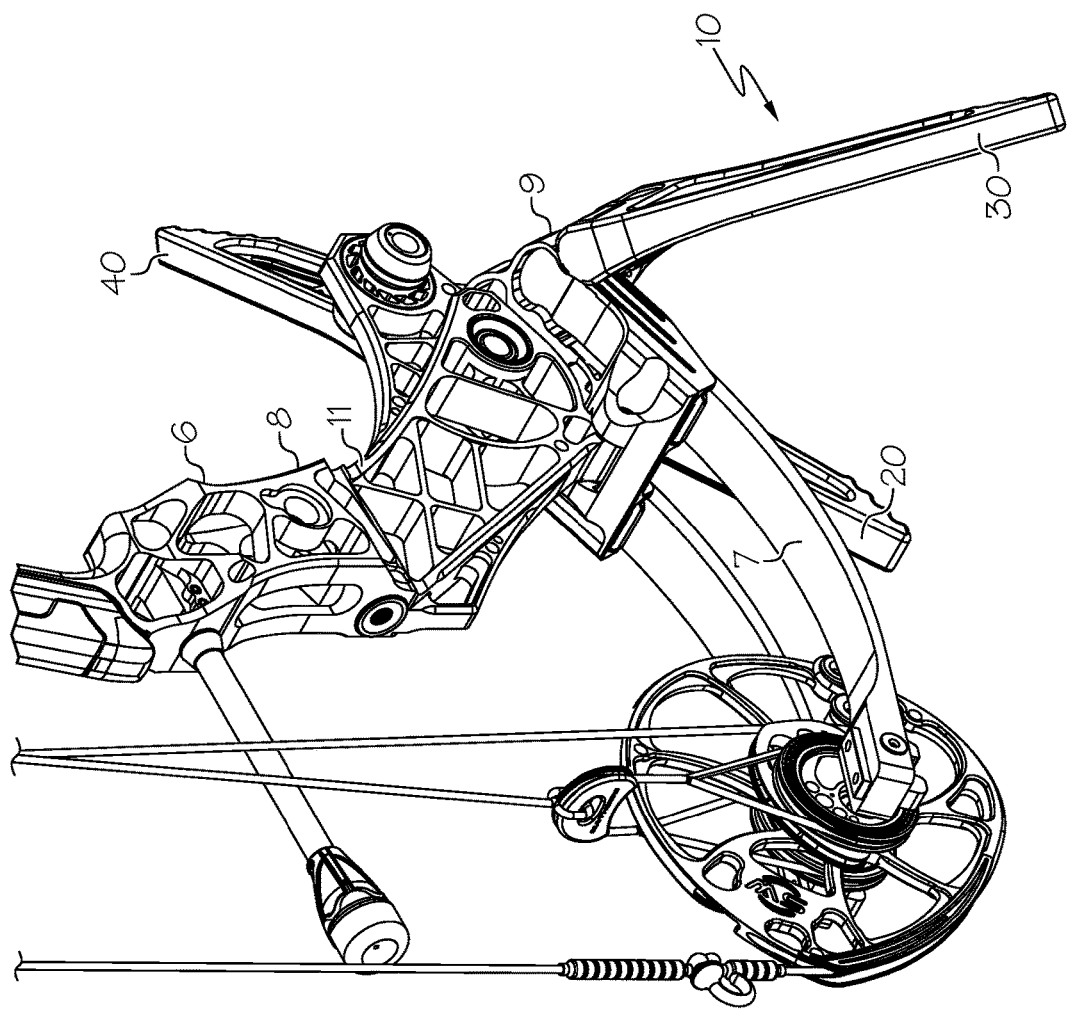

FIG. 5 shows the bow stand 10 moved with respect to its position in FIG. 4 with respect to the archery bow 6. The bow stand 10 and archery bow 6 have moved with respect to one another such that a portion of the frame 8 is oriented in the first cavity 28 (see FIG. 1). As shown, a portion of the limb cup 9 is oriented in the first cavity 28. Thus, the bow 6 is engaged with a portion of the engagement cavity 50 in FIG. 5.

FIG. 5 also shows the third body portion 40 moved from the first orientation and in a second orientation.

Figure 6:
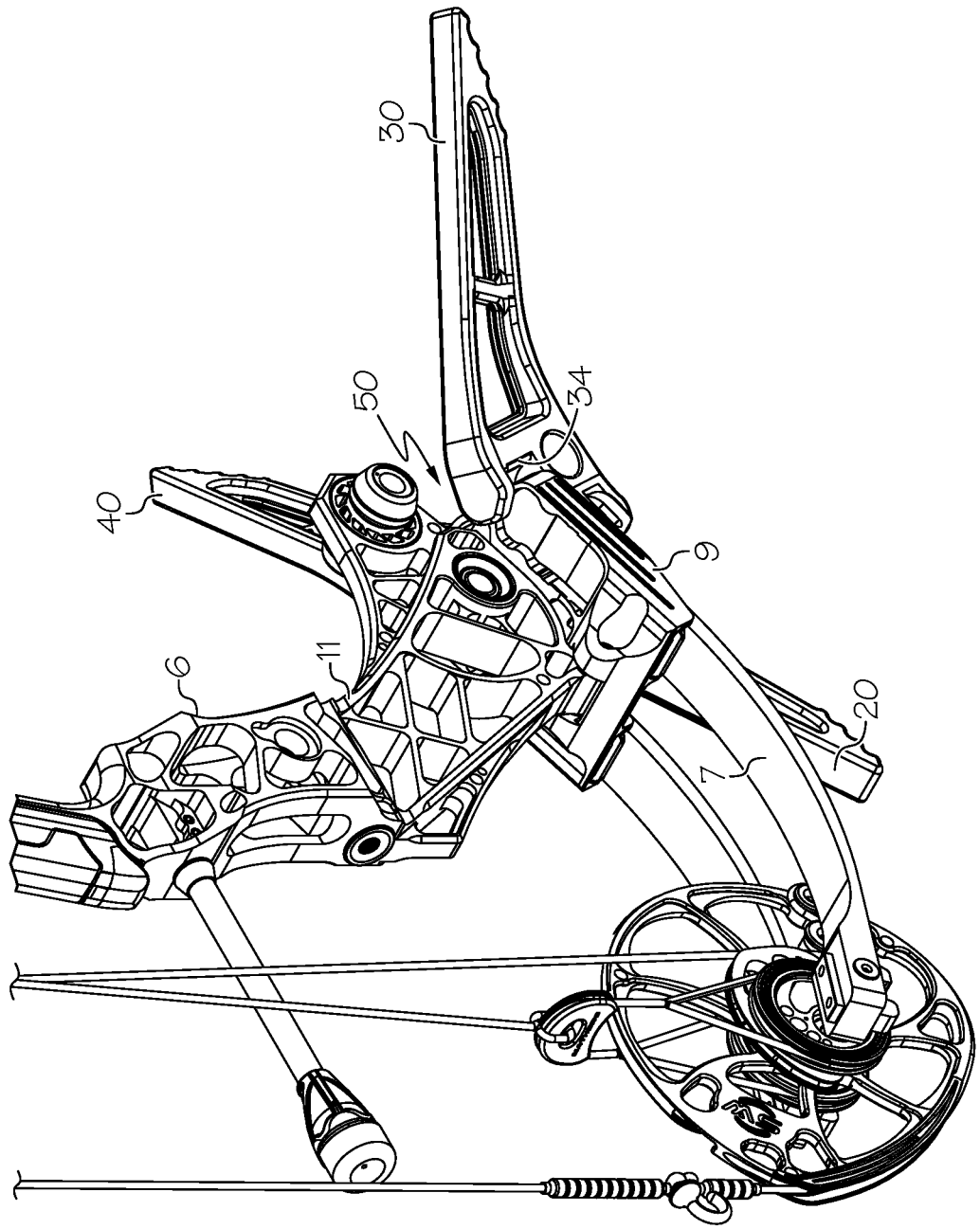
FIG. 6 shows an archery bow supported by an archery bow stand.

FIG. 6 shows the second body portion 30 also moved to a second orientation. In some embodiments, the body 12 comprises a second orientation where the bow stand 10 is engaged with an archery bow 6. In some embodiments, the second orientation comprises a supporting orientation where the bow stand 10 fully supports the archery bow 6. In some embodiments, the archery bow 6 does not contact the ground when supported by the bow stand 10.

In some embodiments, a portion of the bow 6 is oriented in the second cavity 38 when the bow stand 10 is in the second orientation. In some embodiments, a portion of the bow 6 is oriented in the third cavity 48 when the bow stand 10 is in the second orientation. In some embodiments, the bumper 34 contacts the archery bow 6 in the second orientation. In some embodiments, the second bumper 44 contacts the archery bow 6 in the second orientation.

In some embodiments, the archery bow 6 is engaged with each of the first cavity 28, second cavity 38 and third cavity 48 portions of the bow stand 10 and the engagement cavity 50 surrounds the limb cup 9.

In some embodiments, the first surface 34 of the second cavity 38 contacts the first surface 70 of the limb cup 9 and the second surface 36 of the second cavity 38 contacts the second surface 72 of the limb cup 9. In some embodiments, the third surface 37 of the second cavity 38 contacts the sidewall 71 of the limb cup 9.

In some embodiments, the first surface 44 of the third cavity 48 contacts the first surface 70 of the limb cup 9 and the second surface 46 of the third cavity 48 contacts the second surface 72 of the limb cup 9. In some embodiments, the third surface 47 of the third cavity 48 contacts the sidewall 71 of the limb cup 9.

In some embodiments, the bow stand 10 does not contact a limb 7 of the archery bow 6 when the bow stand 10 is supporting the archery bow 6. In some embodiments, the bow stand 10 does not contact a limb 7 of the archery bow 6 when the bow 6 is engaged with the engagement cavity 50.

In some embodiments, a bow 6 comprises a rigid portion comprising a frame 8 and a dynamic portion comprising a limb 7 and other portion(s) of the bow 6 that move during draw. In some embodiments, the bow stand 10 does not contact a dynamic portion of the bow 6 when engaged with the bow 6.

Figure 7:
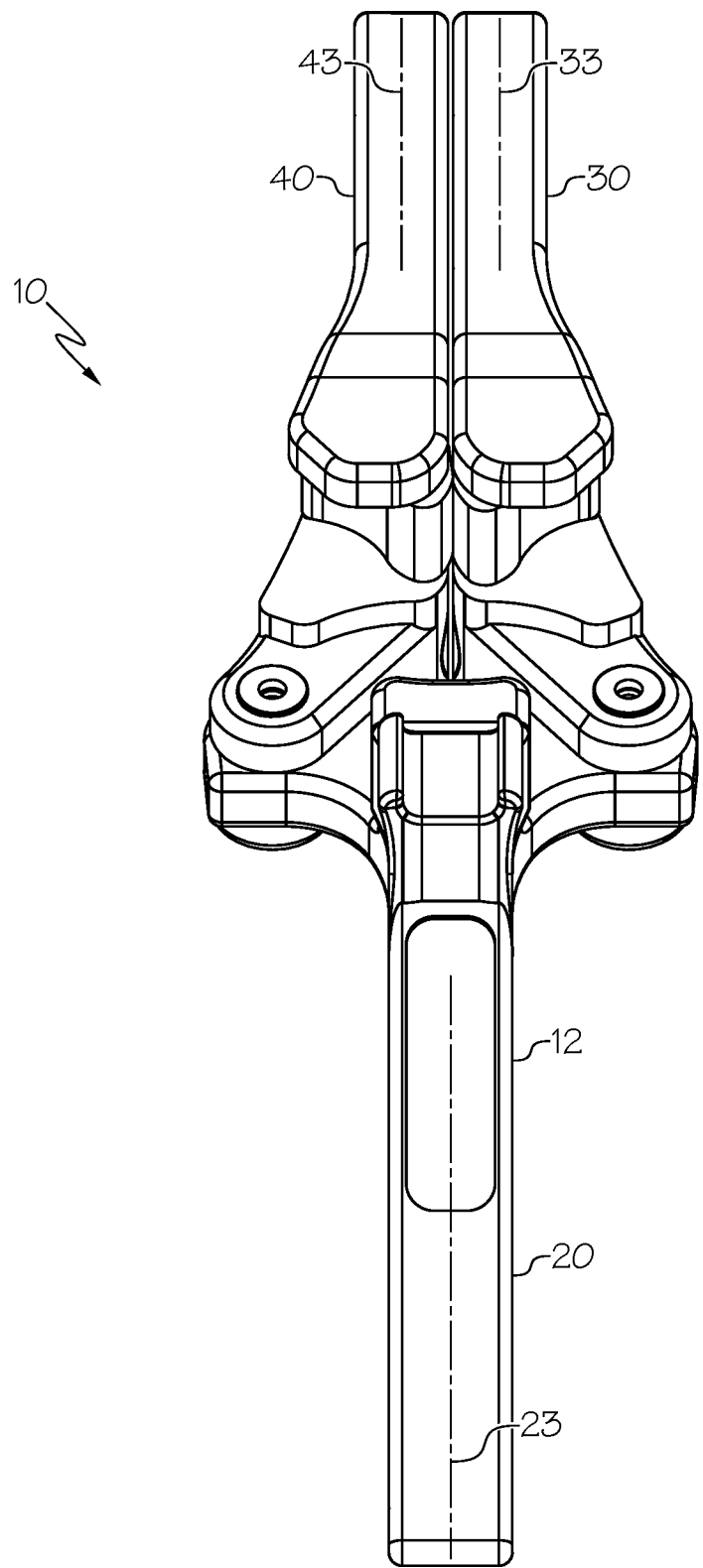
FIG. 7 shows an embodiment of an archery bow stand in another orientation.

FIG. 7 shows an embodiment of a bow stand 10 in another orientation, such as a third orientation. In some embodiments, a third orientation comprises a storage orientation. In some embodiments, a width of the bow stand 10 is minimized in the third orientation.

In some embodiments, the second body portion 30 contacts the third body portion 40 in the third orientation. In some embodiments, a longitudinal axis 33 of the second body portion 30 extends parallel to a longitudinal axis 43 of the third body portion 40 in the third orientation. In some embodiments, the longitudinal axes 33, 43 extend parallel to a longitudinal axis 23 of the first body portion 20.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A bow stand arranged to support an archery bow, the archery bow comprising a frame and a limb, the bow stand comprising:
   a first body portion, a second body portion and a third body portion, the second body portion moveable with respect to the first body portion, the third body portion moveable with respect to the first body portion and with respect to the second body portion, the first body portion comprising a first longitudinal axis, the second body portion comprising a second longitudinal axis and a first bumper, the third body portion comprising a third longitudinal axis and a second bumper;
   the first body portion comprising a first contact surface, the second body portion comprising a second contact surface, the third body portion comprising a third contact surface; and
   an engagement cavity arranged to engage the frame, the first bumper and the second bumper arranged to contact the frame;
   the bow stand comprising a first orientation wherein the first longitudinal axis is parallel to the second longitudinal axis and parallel to the third longitudinal axis;
   the bow stand arranged to support the archery bow with a portion of the frame oriented in the engagement cavity and the first contact surface, second contact surface and third contact surface in contact with a supporting surface, wherein the bow stand contacts the frame but does not contact the limb.

2. The bow stand of claim 1, comprising a second orientation wherein the first longitudinal axis is nonparallel to the second longitudinal axis.

3. The bow stand of claim 1, comprising a stop arranged to limit movement of the second body portion with respect to the first body portion.

4. The bow stand of claim 1, the first body portion comprising a first cavity, the second body portion comprising a second cavity, the engagement cavity comprising the first cavity and the second cavity.

5. The bow stand of claim 1, wherein the third body portion contacts the second body portion in the first orientation.

6. The bow stand of claim 4, the third body portion comprising a third cavity, the engagement cavity comprising the third cavity.

7. The bow stand of claim 1, the bow comprising a limb cup, the engagement cavity arranged to engage the limb cup.

8. A device comprising:
   an archery bow comprising a frame and a limb; and
   a bow stand comprising a first body portion comprising a first cavity;

a second body portion moveable with respect to the first body portion about a first axis, the second body portion comprising a second cavity and a first bumper; and a third body portion moveable with respect to the first body portion about a second axis, the second axis offset from the first axis, the third body portion comprising a third cavity and a second bumper;

wherein the first cavity, the second cavity and the third cavity form an engagement cavity arranged to engage the frame, the first bumper and the second bumper arranged to contact the frame;

the bow stand arranged to support the archery bow with a portion of the frame oriented in the engagement cavity, wherein the bow stand contacts the frame but does not contact the limb.

9. The device of claim 8, the second body portion rotatable with respect to the first body portion.

10. The device of claim 9, the third body portion rotatable with respect to the first body portion.

11. The device of claim 8, the third body portion comprising a mirror image of the second body portion taken across a reference plane.

12. The device of claim 11, the reference plane bisecting the first body portion.

13. The device of claim 8, the first bumper moveable with respect to the second body portion.

14. The device of claim 8, comprising a stop arranged to limit movement of the second body portion with respect to the first body portion.

15. The device of claim 8, comprising a first contact surface, a second contact surface and a third contact surface arranged to contact a supporting surface.

16. The device of claim 15, the first body portion comprising the first contact surface, the second body portion comprising the second contact surface.

17. The device of claim 8, the bow comprising a limb cup, the engagement cavity arranged to engage the limb cup.

18. The device of claim 8, the third body portion moveable with respect to the second body portion.

* * * * *